United States Patent Office 2,984,675
Patented May 16, 1961

2,984,675
3-OXYGENATED 6β-HALO-5-METHYL-19-NOR-5β-CHOLEST-9-ENES

Joseph S. Mihina, Skokie, Ill., assignor to G. D. Searle & Co., Chicago, Ill., a corporation of Delaware No Drawing. Filed June 12, 1959, Ser. No. 819,835

7 Claims. (Cl. 260—397.2)

This invention relates to 3-oxygenated 6-halo-5-methyl-19-nor-5β-cholest-9-enes and processes for the manufacture thereof. More particularly, this invention relates to compounds of the formula

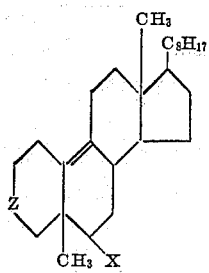

wherein X represents halogen and Z represents a hydroxymethylene (—CHOH—), alkanoyloxymethylene (—CHOCOR—), or carbonyl (—CO—) radical, R in the parenthetical formula standing for an alkyl radical. Among the halogens represented by X, especially those having an atomic number less than 53—which is to say fluorine, chlorine, and bromine—are preferred. The hydroxymethylene and alkanoyloxymethylene radicals comprehended by Z are desirably in the beta configuration, and the latter groupings are best adapted to purposes of this invention when the alkyl constituent (R) is of lower order. Lower alkyl radicals include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates wherein $n$ is a positive integer amounting to less than 9. Alkanoyloxymethylene radicals of the preferred type are hereinafter referred to as lower alkanoyloxymethylene radicals. Those skilled in the art will recognize that when Z in the generic formula designates such groupings, the compounds contemplated are esters of the alcohols depicted when Z represents a hydroxymethylene radical.

The compounds of this invention are useful by reason of their valuable pharmacological properties. Thus, for example, they counteract the infective propensities of cortisone and manifest anti-cholesterologenic activity.

Manufacture of the subject compositions proceeds from corresponding halodiol esters of the formula

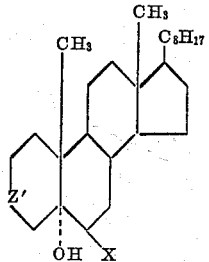

Z' being representative of an alkanoyloxymethylene radical and X being defined as before. On heating such an ester under appropriately esterifying and dehydrating conditions—for example, with an alkanoic acid anhydride in the presence of potassium acid sulfate or sulfuric acid, and with a corresponding alkanoic acid added to increase solubility, if desired—one obtains the claimed esters hereof. These, in turn, are subject to mild saponification—for example, by heating with alkali carbonate in aqueous methanol—to give the 3-ols of this invention; and the latter compounds are oxidized to the subject 3-ones by heating with chromium trioxide in a heterogeneous medium comprising, essentially, aqueous acetic acid and an inert solvent for the steroid present.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*3β-acetoxy-6β-fluoro-5-methyl-19-nor-5β-cholest-9-ene*

A mixture of 6 parts of 3β-acetoxy-6β-fluoro-5α-cholestan-5-ol [preparable by the procedure of Bowers and Ringold, Tetrahedron, 3, 14 (1958)] dissolved in 150 parts of acetic anhydride, approximately 4 parts of powdered potassium bisulfate, and 75 parts of acetic acid is heated with agitation at 65–75° for 45 minutes. The resultant mixture is dumped into 500 parts of cold saturated brine and let stand therein for 1½ hours. The mixture thus obtained is extracted with dichloromethane; and the dichloromethane extract is consecutively washed with water, aqueous 10% sodium bicarbonate, and water again. It is then dried over anhydrous sodium sulfate and stripped of solvent by distillation. The residue is chromatographed on silica gel, using benzene and hexane as developing solvents. From eluates comprising equal volumes of benzene and hexane, upon evaporation of the solvents and crystallization of the residue from absolute ethanol, one obtains the desired 3β-acetoxy-6β-fluoro-5-methyl-19-nor-5β-cholest-9-ene melting at approximately 92.5–93°. A 1% solution of the product in chloroform shows a specific rotation of +93.3°. The product has the formula

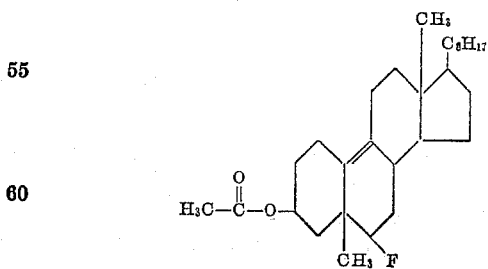

EXAMPLE 2

*3β-acetoxy-6β-chloro-5-methyl-19-nor-5β-cholest-9-ene*

A mixture of 15 parts of 3β-acetoxy-6β-chloro-5α-cholestan-5-ol [preparable by the procedure of Ruzicka and Bosshard, Helv. Chim. Acta., 20, 244 (1937)] and approximately 4 parts of powdered potassium bisulfate in 130 parts of acetic anhydride is heated with agitation at 75–85° for 30 minutes. The resultant mixture is dumped into 1500 parts of aqueous 10% sodium chloride and let stand therein for 2 hours. Precipitated solids are filtered off, dried in air, and crystallized from acetone to yield 3β-acetoxy-6β-chloro-5-methyl-19-nor-5β-cholest-9-ene melting at 139–141°. A 1% solution of the product in chloroform has a specific rotation of +131.9°. The product has the formula

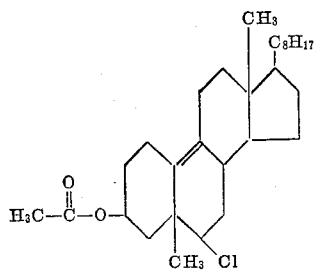

EXAMPLE 3

3β-acetoxy-6β-bromo-5-methyl-19-nor-5β-cholest-9-ene

A mixture of 30 parts of 3β-acetoxy-6β-bromo-5α-cholestan-5-ol [preparable from the corresponding 3,5-diol of Barton and Miller, J. Amer. Chem. Soc., 72, 1066 (1950) by acetylation with pyridine and acetic acid in accordance with the precedure applied to synthesis of the fluorine and bromine homologs by Bowers and Ringold, Tetrahedron, 3, 14 (1958) and Barton and Miller, J. Amer. Chem. Soc., 72, 373 (1950), respectively] and 9 parts of powdered potassium bisulfate in 200 parts of acetic anhydride and 200 parts of acetic acid is heated with agitation at 40° for 2 hours. The mixture is then poured into 1200 parts of aqueous 15% sodium chloride and let stand therein for 2 hours. The resultant mixture is extracted with isopropyl acetate. The acetate extract is consecutively washed with aqueous 10% sodium bicarbonate and water, then dried over anhydrous sodium sulfate and stripped of solvent by vacuum distillation. The residue, crystallized from a mixture of ethyl acetate and hexane, affords 3β-acetoxy-6β-bromo-5-methyl-19-nor-5β-cholest-9-ene melting at approximately 141.5–142.5°. A 1% solution in chloroform has a specific rotation of +133.5°. The product has the formula

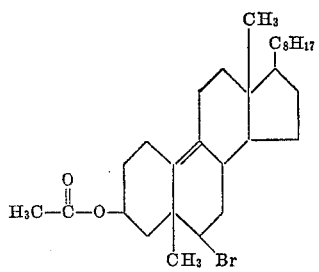

EXAMPLE 4

6β-chloro-5-methyl-19-nor-5β-cholest-9-en-3β-ol

To 13 parts of 3β-acetoxy-6β-chloro-5-methyl-19-nor-5β-cholest-9-ene in 560 parts of methanol is added 28 parts of potassium carbonate dissolved in 250 parts of water. The resultant mixture is heated with agitation at 85–95° for 1 hour and then concentrated to approximately one-third its original volume by vacuum distillation. The concentrate is extracted with isopropyl acetate; and the acetate extract is washed with water, dried over anhydrous sodium sulfate, and stripped of solvent by distillation. The residue is the desired 6β-chloro-5-methyl-19-nor-5β-cholest-9-en-3β-ol, of the formula

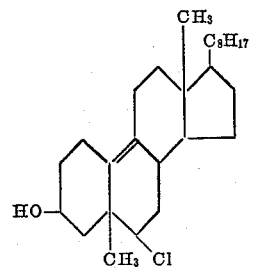

By the foregoing procedure, 3β-acetoxy-6β-fluoro-5-methyl-19-nor-5β-cholest-9-ene and 3β-acetoxy-6β-bromo-5-methyl-19-nor-5β-cholest-9-ene likewise are converted to the corresponding alcohols, 6β-fluoro-5-methyl-19-nor-5β-cholest-9-en-3β-ol and 6β-bromo-5-methyl-19-nor-5β-cholest-9-en-3β-ol, respectively.

EXAMPLE 5

6β-chloro-5-methyl-19-nor-5β-cholest-9-en-3-one

A solution of approximately 4 parts of chromium trioxide in 48 parts of acetic acid and 24 parts of water is added with agitation at room temperatures during 15 minutes to a solution of approximately 10 parts of 6β-chloro-5-methyl-19-nor-5β-cholest-9-en-3β-ol in 135 parts of benzene. The addition having been completed, agitation at room temperatures is continued for 5 hours, whereupon 1 part of sodium sulfite is introduced. The aqueous phase is separated and extracted with isopropyl acetate. The benzene phase is combined with the acetate extract, and the resultant solution is consecutively washed with aqueous 10% sodium bicarbonate and water, water-washing being continued until the washes are essentially neutral. The benzene-acetate solution is then dried over anhydrous sodium sulfate and stripped of solvent by vacuum distillation. The residue is the desired 6β-chloro-5-methyl-19-nor-5β-cholest-9-en-3-one, of the formula

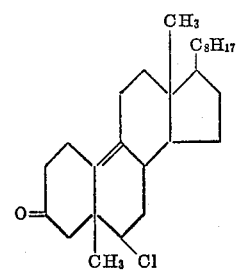

By the foregoing procedure, 6β-fluoro-5-methyl-19-nor-5β-cholest-9-en-3β-ol and 6β-bromo-5-methyl-19-nor-5β-cholest-9-en-3β-ol likewise are converted to the corresponding ketones, 6β-fluoro-5-methyl-19-nor-5β-cholest-9-en-3-one and 6β-bromo-5-methyl-19-nor-5β-cholest-9-en-3-one, respectively.

What is claimed is:
1. A compound of the formula

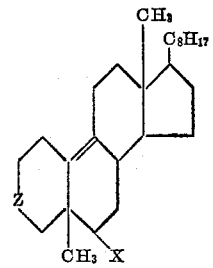

wherein Z is selected from the group consisting of β-hydroxymethylene, β-(lower alkanoyloxy)methylene, and carbonyl radicals and X is halogen of atomic number less than 53.

2. A compound of the formula

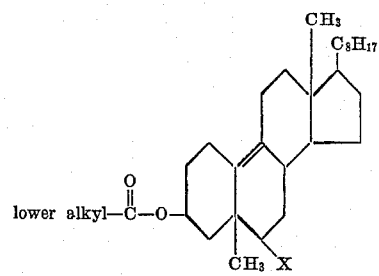

wherein X is halogen of atomic number less than 53.

3. 3β-acetoxy-6β-fluoro-5-methyl-19-nor - 5β - cholest-9-ene.
4. 3β-acetoxy-6β-chloro-5-methyl-19-nor - 5β - cholest-9-ene.
5. 3β-acetoxy-6β-bromo-5-methyl-19-nor - 5β - cholest-9-ene.
6. 6β-chloro-5-methyl-19-nor-5β-cholest-9-en-3β-ol.
7. 6β-chloro-5-methyl-19-nor-5β-cholest-9-en-3-one.

References Cited in the file of this patent

Aebli et al.: Helv. Chim. Acta., vol. 41, pgs. 774–785 (1958).